May 27, 1930.  J. A. BARNHART  1,760,733
STEERING GEAR
Filed May 25, 1927   2 Sheets-Sheet 1
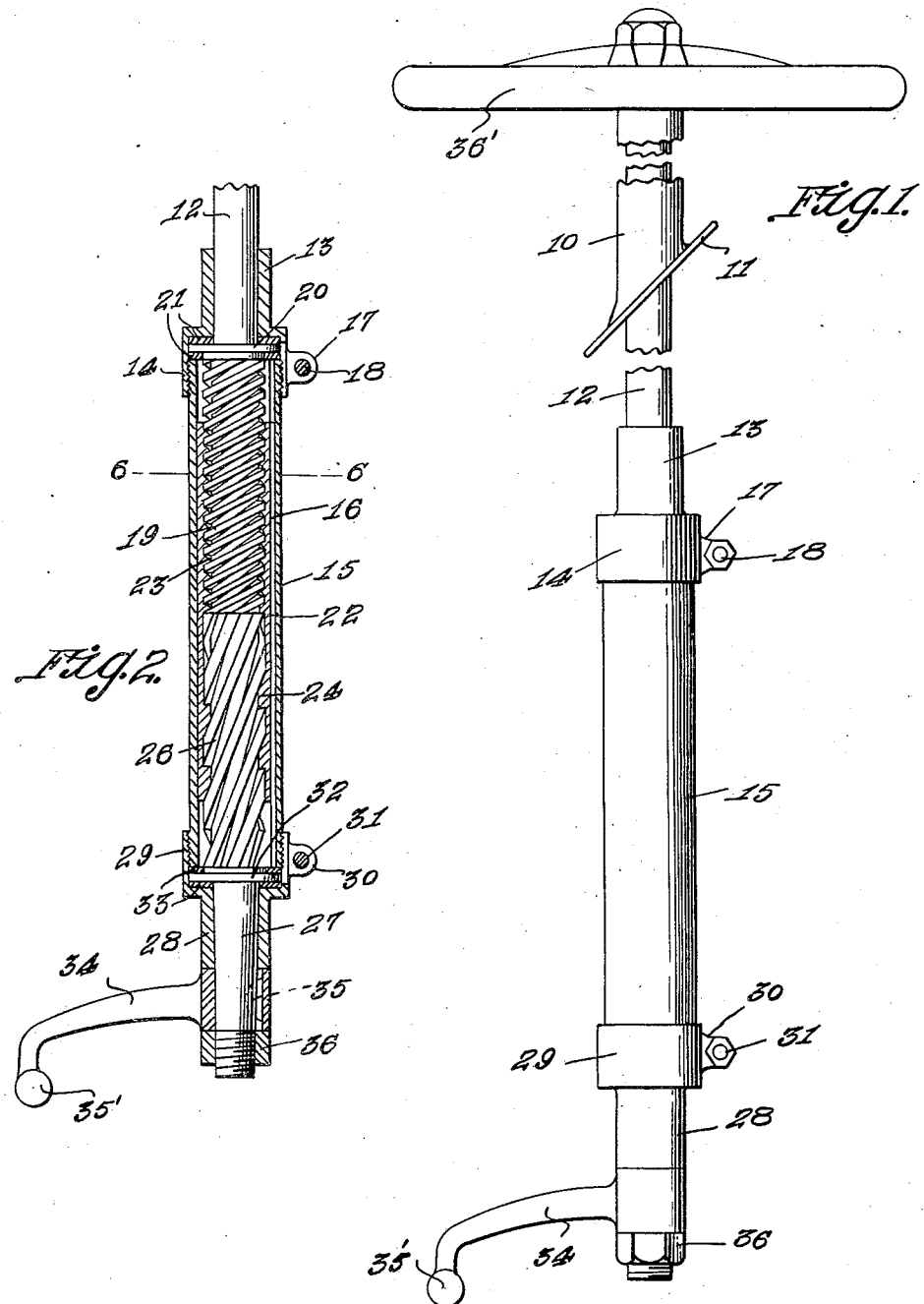
J. A. Barnhart,
INVENTOR
BY Victor J. Evans
ATTORNEY

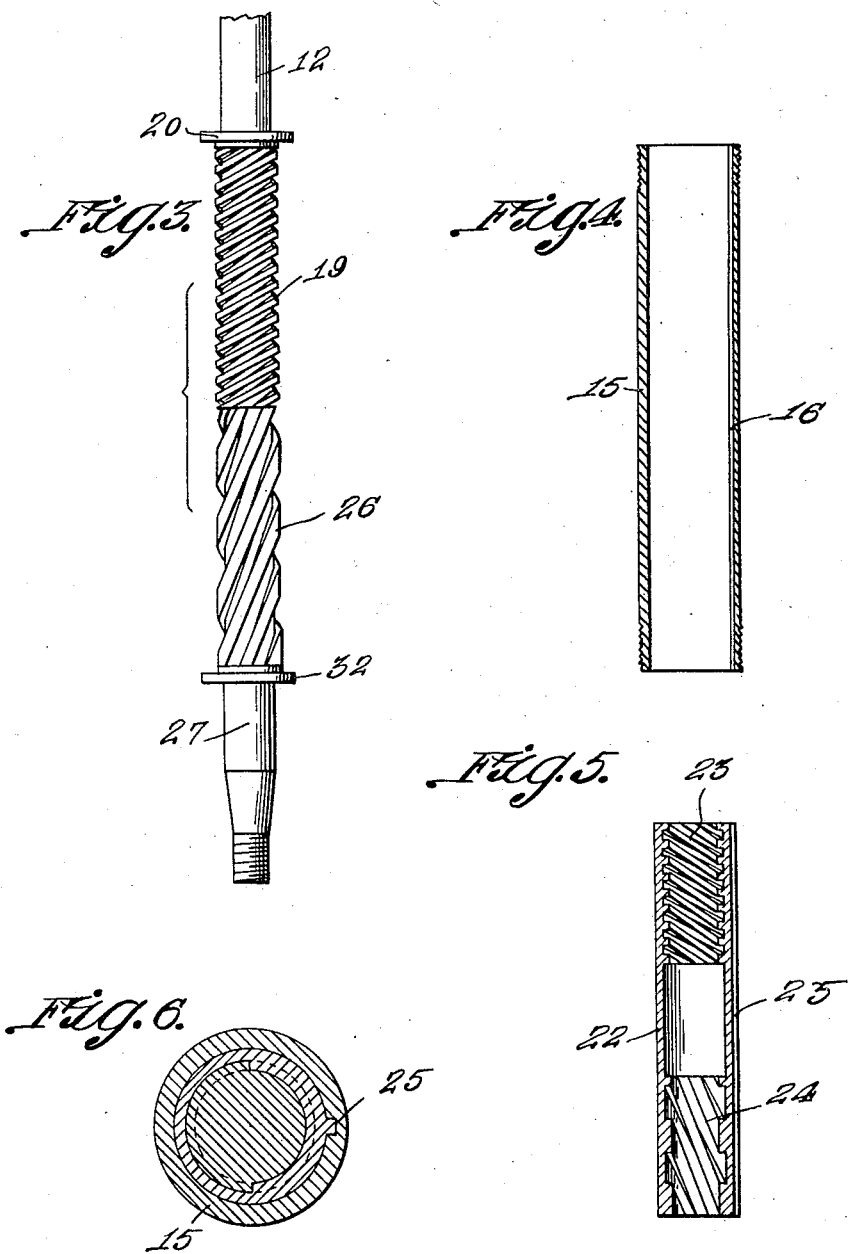

Patented May 27, 1930

1,760,733

UNITED STATES PATENT OFFICE

JAMES A. BARNHART, OF CONSTANTINE, MICHIGAN

STEERING GEAR

Application filed May 25, 1927. Serial No. 194,189.

This invention relates to control mechanism for motor vehicles and has for its object the provision of a novel steering gear which will be non-reactive or in other words entirely safe in its operations inasmuch as the striking of the front wheels of the vehicle against stones, ruts or other obstructions will have no effect upon the steering wheel, the driver being thus relieved of any strain in driving.

An important object is the provision of a steering mechanism of this character which is, in some respects, more or less similar to certain others of the worm or screw type with the additional advantage that all the bearing or working surfaces are in engagement instead of only certain ones being in engagement at certain times, a feature in this detail being that there is no concentration of strain at any localized point or points, the stresses and strains being distributed uniformly throughout the working areas.

Another object is to provide a mechanism of this character which may be quickly and easily installed upon a motor vehicle to replace the usual type of steering mechanism or which may be just as easily installed as part of new equipment, the entire structure being moreover simple and inexpensive in manufacture, positive in action, efficient and durable in service, and a general improvement in the art.

With the above and other objects and advantages in view, the invention preferably consists in the details of construction and the arrangement and combination of parts to be hereinafter more fully described and claimed, and illustrated in the accompanying drawings, in which:

Figure 1 is a side elevation of a steering column and associated parts illustrating the invention.

Figure 2 is a longitudinal sectional view therethrough.

Figure 3 is an elevation of the relatively movable or operating member.

Figure 4 is a longitudinal section through the housing.

Figure 5 is a similar view through the shiftable sleeve, and

Figure 6 is a detail cross sectional view taken on the line 6—6 of Figure 2.

Referring more particularly to the drawings, the numeral 10 designates a steering post or column having the usual attaching plate member 11 by means of which it may be mounted upon the floor-board or dash of a motor vehicle or other device. Journaled through the column or post 10 is a steering rod 12 which is also journaled in the hub portion 13 of collar 14 screwed or otherwise suitably secured upon the upper end of an elongated housing 15 which is formed in one side with a longitudinally extending groove or keyway 16 for a purpose to be described. To prevent unscrewing of the member 14 with respect to this housing it is preferable that the member 14 be of split construction and provided with terminal ears 17 through which passes a clamping bolt 18 by means of which the member 14 may be contracted about the end of the housing so as to be immovable with respect thereto.

The rod 12 terminates in or is otherwise provided with an operating screw member 19 which is of course rotatable with respect to the housing 15 and which extends throughout substantially one-half of the housing. At the juncture of the rod 12 with the operating screw portion 19 thereon is a thrust member 20 operating between a pair of spaced washers 21 located within the end member 14 so that the rod 12 and the operating screw member 19 will be restrained from longitudinal movement with respect to the housing 15.

Slidably mounted within the housing and constrained against turning movement with respect thereto is a sleeve 22 having a threaded portion 23 conformingly engaging or receiving the operating screw portion 19, this sleeve also having a second threaded or spirally grooved portion 24, the grooves or threads being of much greater pitch than the threads of the portion 19 as clearly indicated. As mentioned above, this sleeve 22 is capable of moving longitudinally within the housing 15 and it is provided with a key 25 fitting within the keyway or groove 16 so as to be restrained from turning movement within the housing.

Operating within the spirally grooved sleeve or spirally grooved portion 24 of the sleeve 22, is a corresponding spirally formed member 26 carried by or formed upon a shaft element 27 which is journaled through the hub portion 28 of an end member 29 screwed or otherwise suitably secured upon the lower end of the housing 15. The member 29 is preferably of split construction and equipped with terminal ears 30 held together by a clamping bolt 31 so that this end member may be contracted tightly upon the housing so that it will be incapable of unscrewing therefrom, the arrangement being identically the same as that described in connection with the upper end member 14. At the juncture of the shaft 27 with the spiral portion 26 thereof is provided a thrust member 32 operating between spaced washers 33 located within the end member 29 for taking up the end thrust. Secured upon the projecting end of the shaft member 27 is a steering arm 34 held in place as by a key or gib 35 and a nut 36, this steering arm 34 terminating in a ball head 35' adapted to be connected with the steering arm connecting rod or equivalent mechanism on the front wheel structure of a motor vehicle.

In the operation of the device, it will be seen that when the steering rod 12 is turned by means of the usual steering wheel indicated at 36' the rotation of the operating screw member or portion 19 will cause the sleeve 22 to be moved longitudinally within the housing 15 in one direction or the other, depending upon the direction of rotation of the wheels. When the sleeve is moved longitudinally the spirally grooved or threaded portion 24 thereof coacting with the corresponding spirally formed portion 26 carried by the rod 27 will cause this portion 26 and consequently the rod 27 carrying the arm 34 to be rotated, and as the arm 34 is connected with the steering arm which in turn is connected with the steering arm connecting rod or equivalent part of a motor vehicle it is obvious that the vehicle wheels will be turned in one direction or the other to effect steering.

From the foregoing description and a study of the drawings, it will be apparent that I have thus provided a very simply constructed, inexpensive and easily installed steering mechanism which will be of great advantage in that it will be non-reactive. That is to say that it is necessary to turn the steering wheel in order to obtain any swinging movement of the front wheels of the vehicle and the striking of the vehicle wheels against a stone, rut or other obstruction will have no effect upon the steering mechanism itself. Clearly, this state of affairs makes the device far safer than the ordinary type of steering mechanism inasmuch as there will be no likelihood of any sudden shocks, jars or strains coming upon the operator. The operator may drive the vehicle with less strenuous attention and still be perfectly safe in so far as steering is concerned.

Another point of advantage is that all of the coacting surfaces are in contact all the time, the stresses and strains being thereby uniformly distributed instead of being localized or centralized at any point or points at any time during the operation. Clearly, there will consequently be less likelihood of excessive wear especially when it is considered that the entire housing of the device is intended to be packed initially with grease. It is really believed that the construction, operation and advantages should be readily understood by one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:—

In a steering mechanism for vehicles, a steering post, a steering rod journally mounted therethrough and carrying a steering wheel, a housing member into which said rod extends, a screw member on said rod rotatably mounted within the housing, a sleeve splined within the housing and having a threaded portion coacting with the screw member, the sleeve further having a spirally grooved portion, a shaft member journaled through the opposite end of the housing and carrying a spirally formed portion coacting with the spirally grooved portion of the sleeve, an arm carried by said shaft, end members telescoped upon the housing and having hub portions constituting bearings respectively for said rod and shaft, and thrust takeup means located within said end members, said thrust takeup means including thrust collars on the rod and shaft, and a pair of washers within each end member located at opposite sides of the collar therein, one being confined between the collar and the end member and the other being confined between the collar and the end of the threaded member or spirally grooved portion, respectively.

In testimony whereof I affix my signature.

JAMES A. BARNHART.